United States Patent [19]

Velie

[11] Patent Number: 4,693,008

[45] Date of Patent: Sep. 15, 1987

[54] RELEASABLE SEPARATE MEMBER LATCHING DEVICE FOR A PORTABLE HAND TOOL

[75] Inventor: Wally W. Velie, Ontario, Calif.

[73] Assignee: Mallard Products, Incorporated, Ontario, Calif.

[21] Appl. No.: 731,317

[22] Filed: May 7, 1985

[51] Int. Cl.[4] .................... B23D 45/16

[52] U.S. Cl. .................... 30/390; 30/391; 30/388; 83/478; 83/546

[58] Field of Search .................... 30/390, 391, 388, 151; 83/478, 397, 348, 546

[56] References Cited

U.S. PATENT DOCUMENTS

| | | | |
|---|---|---|---|
| 2,926,709 | 3/1960 | Kaley | 83/478 |
| 3,701,369 | 10/1972 | Gronke et al. | 30/391 |
| 4,176,571 | 12/1979 | Batson | 83/478 X |

FOREIGN PATENT DOCUMENTS

| | | | |
|---|---|---|---|
| 1052104 | 3/1959 | Fed. Rep. of Germany | 30/388 |
| 280809 | 12/1970 | U.S.S.R. | 30/391 |

*Primary Examiner*—E. R. Kazenske
*Assistant Examiner*—Willmon Fridie, Jr.
*Attorney, Agent, or Firm*—Fleit, Jacobson, Cohn & Price

[57] ABSTRACT

A releasable latching device (32) for a portable circular power saw (10) includes a pivotable latch member (32) for releasably latching or locking a guard member (22) for a rotary saw blade (20) in a guarding position, to preclude serious injury to an operator during use of the saw. The latch member (34) includes a hook (44) engagable in a first retaining notch (46) or a second retaining notch (50) in a hub (48) of the guard member (22) for this purpose, depending upon whether the saw (10) is being used to make a straight cut or a 45° cut. The latch member (34) is retained in a latching positon by a spring biased push rod (52) and is moved to an unlatching position by operation of the push rod. A permanent magnet (64) on the latch member then cooperates with a ferromagnetic strip (66) on the hub (48) of the guard member (22) to temporarily retain the latch member in its unlatched position as the guard member is rotated to an unguarding position by an article during a sawing operation, after which the permanent magnet and ferromagnetic strip disengage such that the latch member will automatically be returned to its latching position when the guard member is returned to its guarding position upon completion of the sawing operation.

18 Claims, 5 Drawing Figures

RELEASABLE SEPARATE MEMBER LATCHING DEVICE FOR A PORTABLE HAND TOOL

BACKGROUND OF THE INVENTION

1. Field of the Invention

This invention relates to a releasable separate member latching device for applications such as a portable hand tool, and more specifically to a releasable guard member latching device for a portable hand tool which automatically relatches the guard member in a guarding position when the guard member returns to the guarding position after a cutting operation.

2. Description of the Prior Art

In a portable hand tool, such as a circular power saw, in which a power driven rotary saw blade performs a cutting or sawing operation on an article, such as a board, it is standard practice to provide a guard member for the rotary saw blade to prevent an operator or other person from becoming injured by the rotating saw blade as a result of coming in contact therewith. The guard member is needed for this purpose even when the saw is not operating, because of the sharpness of the teeth of the saw blade. Further, the guard member becomes particularly important when the saw is in operation, because of the high rate of speed at which the saw blade rotates, in order to prevent serious injury to the operator during a sawing operation.

More specifically, in known circular power saws the guard member is journaled on a housing portion for a rotatable drive shaft on which the saw blade is mounted for a sawing operation. The guard member is biased into a guarding position by a relatively strong coil spring, to prevent the operator from inadvertently engaging the rotary saw blade both when the saw is inoperative and when the saw has been energized, either inadvertently or in preparation for a sawing operation. In a sawing operation, as the saw blade is moved through a board being cut, the guard member engages the board and is moved to a retracted unguarding position as the saw blade moves through the board. When the cut through the board has been completed, the saw is removed from the board and the above-mentioned coil spring automatically returns the guard member to its guarding position.

However, just as the guard member can be moved to its unguarding position by a board during a sawing operation, the guard member also can be inadvertently moved to its unguarding position by the operator engaging the guard member with his hand, arm, leg or another part of his body. When this occurs, as noted above, the operator can be seriously injured. Accordingly, a need exists for a device to latch or lock the guard member in its guarding position when the saw is not being used in a sawing operation. The latching device also should be readily releasable by the operator when it is desired to use the saw in a sawing operation, and should automatically relatch the guard member in its guarding position after the sawing operation has been completed. In this connection, a primary purpose of this invention is to provide a releasable latching device for a guard member of a portable hand tool, such as a circular power saw, wherein the latching device has these desirable features. Other applications for the releasable latching device are manifest.

SUMMARY OF THE INVENTION

In general, this invention relates to a releasable separate member latching device for use in an application such as a portable hand tool. The latching device includes a latch member which is movable between latched and unlatched positions with respect to a separate member and which has a latching portion for engaging a retaining portion of the separate member to preclude its movement from an initial locked position into a second unlocked position with respect to the latch member. The latch member includes a means, which is cooperable with a means on the separate member, for retaining the latch member in its unlatched position to permit movement of the separate member to its unlocked position with respect to the latch member. A means also is provided for releasing the cooperable means for retaining the latch member in its unlatched position, after the separate member has moved out of its initial locked position.

More specifically, the latch member is of pivotable construction and includes a latching portion, an operating portion and a permanent magnet provided on the latch member. The latching portion includes a hook which is engagable with a first retaining portion of a pivotable hub of a guard member for a circular power saw when the saw is being used in a straight cutting operation, and which is engagable, if necessary, with a second retaining portion of the guard member hub when the saw is being used to make a 45° cut. The operating portion of the pivotable latch member is connected to an elongated resiliently biased push rod for moving the latch member into its unlatched position, with the push rod being of a length sufficient to extend from adjacent one side of a housing of the circular saw, through the housing to and beyond an opposite side of the housing. When the pivotable latch member is moved to its unlatched position by operation of the push rod, the permanent magnet of the pivotable latch member cooperates with a ferromagnetic strip inlaid in the non-magnetic hub of the guard member, to temporarily retain the latch member in its unlatched position such that the guard member can be moved toward its unguarding position during a sawing operation. Subsequently, the permanent magnet disengages from the ferromagnetic strip and the latch member is biased back toward its latching position such that when the guard member subsequently returns to its guarding position after the sawing operation has been completed, the latch member automatically relatches the guard member in its guarding position.

DETAILED DESCRIPTION

Figure 1:
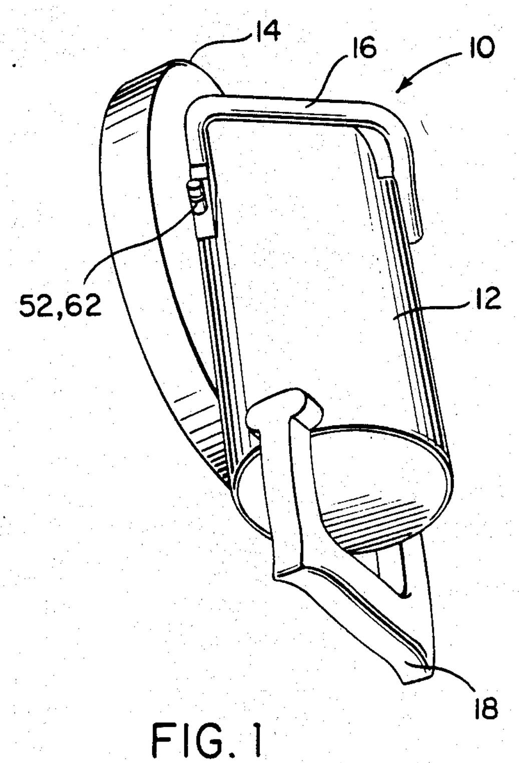
FIG. 1 is an isometric view of part of a portable circular power saw in which the releasable guard member latching device of the invention can be utilized, as viewed in a first direction.
Figure 5:
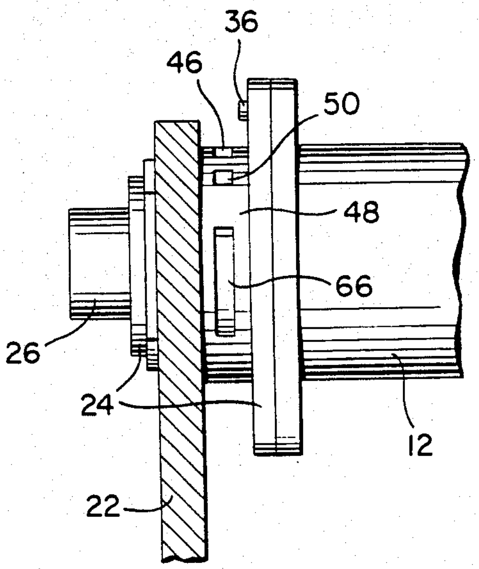
FIG. 5 is a partial cross-sectional view taken essentially along the line 5—5 in FIG. 3.
Figure 2:
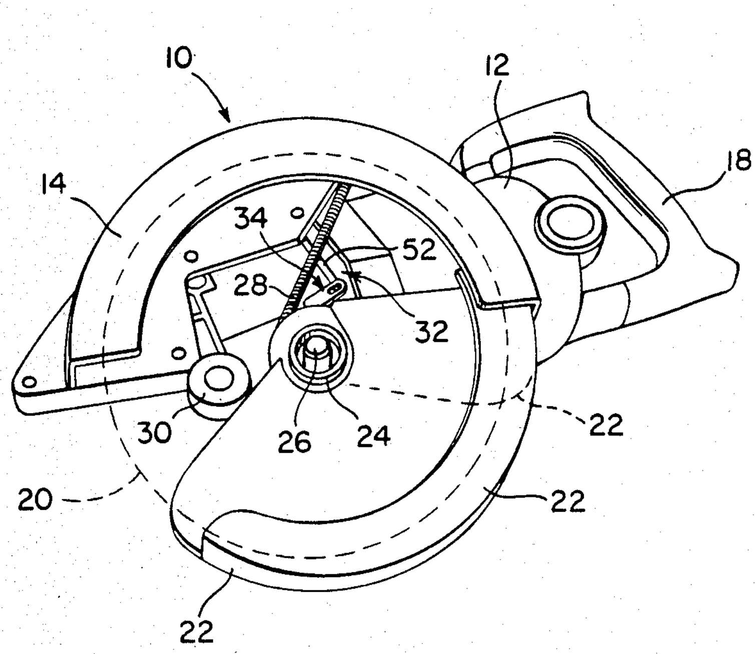
FIG. 2 is another isometric view of the circular power saw shown in FIG. 1, as viewed in a second direction.

FIG. 1 discloses a portable hand tool in the form of a circular power saw 10 having a motor housing 12, a saw blade housing 14 secured to the motor housing, a top gripping handle 16 and an end gripping handle 18. Referring to FIG. 2, which discloses the outline of a circular saw blade 20 in dashed lines, the circular power saw 10 further includes a lower guard member 22 for the saw blade. The guard member 22, which is formed of a non-magnetic material, such as an aluminum alloy, is rotatably or pivotably mounted on a shaft support hub 24 secured to the motor housing 12 and having a saw blade drive shaft 26 projecting therefrom. The saw blade 20 is mounted on the drive shaft 26 in a suitable manner, not shown. The circular power saw 10 further includes a pivotal foot member (not shown) for supporting the saw on an article, such as a board (not shown), during a sawing operation.

The guard member 22 is rotatably mounted on the shaft support hub 24 for movement between an initial locked or guarding position with respect to the saw blade 20, as shown in solid lines in FIG. 2, and a second unlocked or unguarding position with respect to the saw blade, as illustrated in dashed lines in FIG. 2, in which the guard member has been rotated approximately 90° from its guarding position. The guard member 22 is biased by a relatively strong coil spring 28 into its guarding position against a circular plastic or rubber stop member 30 suitably mounted on the saw blade housing 14, with the coil spring having opposite ends connected to the guard member and an interior portion of the saw blade housing in a known manner. During a sawing operation, as the saw blade 20 is moved into engagement and through a board (not shown) to be cut, the guard member 22 is engaged by the board and moved counterclockwise in FIG. 2 by the board from its guarding position into its unguarding position. After the cut through the board has been completed and the guard member 22 clears the board, or the saw is removed from engagement with the board, the guard member is returned to its guarding position by the coil spring 28.

Figure 4:
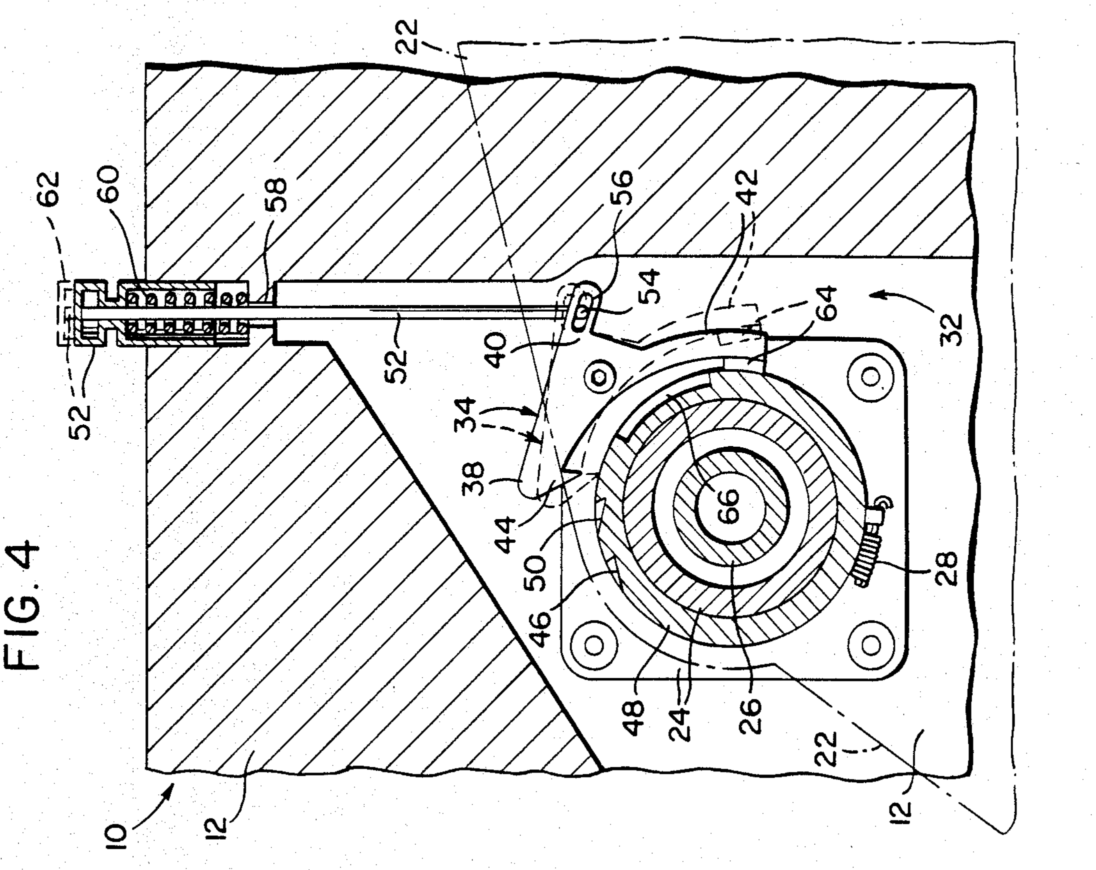
FIG. 4 is a cross-sectional view similar to FIG. 3 and illustrating additional operating positions of the releasable guard member latching device of the invention.
Figure 3:
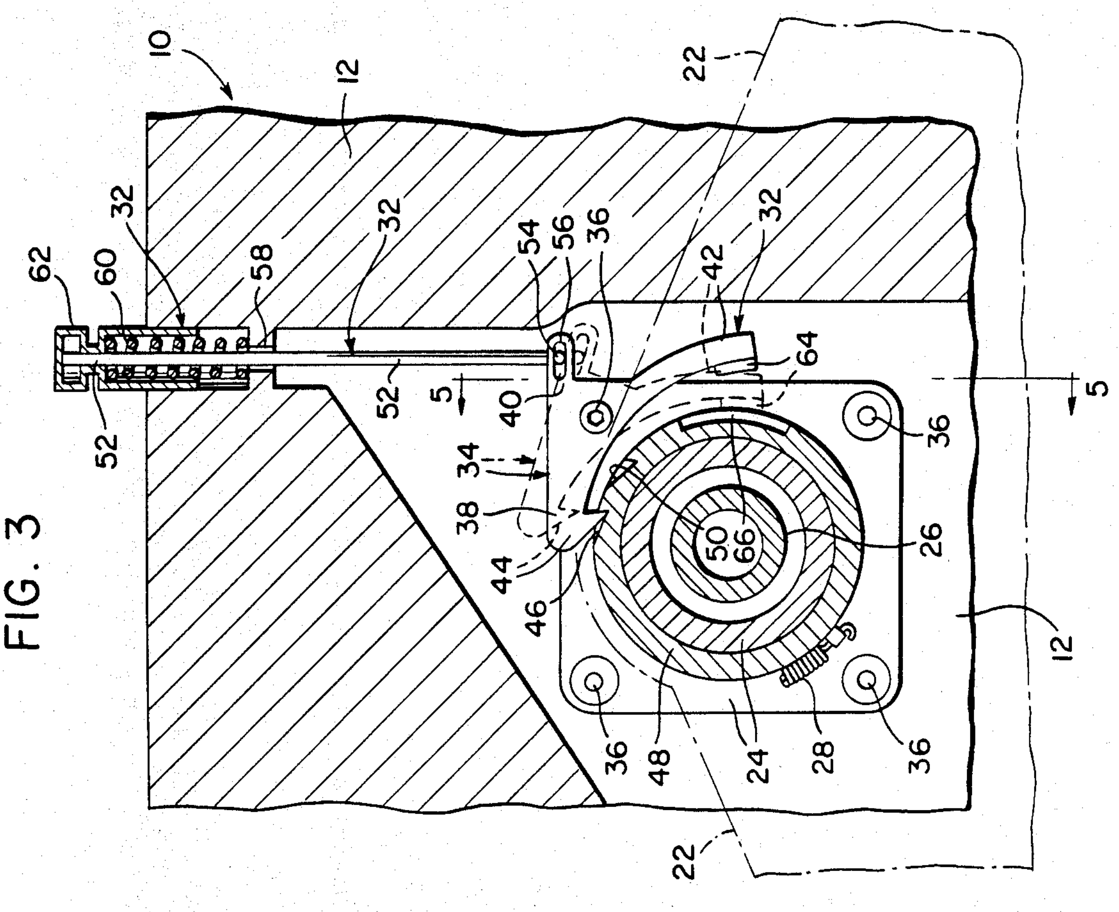
FIG. 3 is a cross-sectional view of a portion of the portable circular power saw shown in FIGS. 1 and 2, and illustrating first and second operating positions of the releasable guard member latching device of the invention.

In accordance with this invention, as is best shown in FIGS. 3 and 4, a releasable latching device 32 is provided for releasably latching or locking the saw blade guard member 22 in its guarding position. The latching device 32 includes a latch member 34, which is pivotably mounted on the shaft support hub 24 by one of a plurality of screws 36 for securing a mounting flange of the support hub to the motor housing 12.

The latch member 34 includes three parts 38, 40 and 42. The first latch member part 38 includes a latch portion in the form of a hook 44 for engaging in a retaining notch 46 formed in a hub 48 of the guard member 22 when the circular power saw 10 is set for making a straight cut through a board, to prevent the guard member from being inadvertently moved from its guarding position to its unguarding position. When the circular power saw 10 is set for making a 45° cut through a board by pivoting the abovementioned foot member (not shown) of the saw, the foot member or other associated parts of the saw may interfere with a complete return of the saw blade lower guard member 22 to its guarding position; therefore, a second retaining notch 50 can be provided in the guard member hub 48 for receiving the hook 44. The second retaining notch 50 can also function as a backup mechanism for the first retaining notch 46 during a straight cut sawing operation, in the event the hook 44 does not seat properly in, or inadvertently becomes displaced from, the first notch.

The second part 40 of the latch member 32 is an operating portion of a construction which permits connection thereof to a lower end portion of a vertically extending push rod 52 for relative pivotable movement. More specifically, the lower end portion of the push rod 52 includes a laterally projecting rod or pin 54 suitably secured to the push rod and receivable in an elongated slot 56 in the latch member part 40.

The vertical push rod 52 extends through an aperture in an internal annular flange 58 in the motor housing 12 and through a cylindrical chamber for a coil biasing spring 60, so as to project above the top of the motor housing. A push button 62 is rigidly secured to an upper end portion of the push rod 52, such as by crimping, with the coil spring 60 being disposed between an internal portion of the push button and the internal annular flange 58 in the motor housing, to bias the push rod upward, thereby biasing the releasable latch member 34 to a latching position, as shown in solid lines in FIG. 3.

Referring to FIG. 1, the upper end of the push rod 52 and the push button 62 thereon project from the motor housing 12 closely adjacent to the top gripping handle 16 of the circular power saw 10 so that the operator can readily depress the push rod and push button with his thumb in readiness for a sawing operation. When the push button 62, and thus the push rod 52, are depressed by the operator, the latch member 34 is pivoted clockwise, as viewed in FIG. 3, from its solid line latched position to an unlatched position as shown in dashed lines. Thus, the guard member 22 is released for movement from its guarding position, as shown in phantom lines in FIG. 3, such that the guard member can be moved toward its unguarding position in the sawing operation, as illustrated by an intermediate position of the guard member shown in phantom lines in FIG. 4.

The third part 42 of the latch member 34 carries a permanent magnet 64 for temporarily retaining the latch member in its unlatched position as the saw blade guard member 22 is moved from its guarding position toward its unguarding position during a sawing operation. In this regard, when the push rod 52 is depressed to pivot the latch member 34 to its unlatching position, as shown in dashed lines in FIG. 3 and shown in solid lines in FIG. 4, the permanent magnet 64 engages a ferromagnetic strip 66 which has been inlaid into the non-magnetic hub 48 of the guard member 22. The permanent magnet 64 and the ferromagnetic strip 66 then cooperate to hold the latch member 34 in its unlatched position as the guard member 22 initially rotates into its unguarding position during the sawing operation.

When the guard member 22 has reached its intermediate position illustrated in phantom lines in FIG. 4, such that the second retaining notch 50 in the hub 48 of the guard member has cleared the latch hook 44, the permanent magnet 64 rides off of the ferromagnetic strip 66 onto a ortion of the non-magnetic guard member hub, as shown in FIG. 4. The push rod coil return spring 60 then causes the latch member 34 to pivot counterclockwise, as viewed in FIG. 4, into a dashed line position as shown in this figure, in which the hook 44 is engaged on the hub 48 of the guard member 22. As the guard member 22 then continues to be rotated into its unguarding position, the hook 44 rides on the hub 48 of the guard member. Subsequently, when the guard member 22 is returned back to its guarding position by its coil return spring 28, the push rod coil return spring 60 further returns the hook 24 on the latch member 34 back into the releasable latching or locking position in the retaining notch 46, or the retaining notch 50, respectively, depending upon whether the circular power saw 10 is being used to make a straight cut or a 45° cut in the sawing operation. The length of the ferromagnetic strip 66 utilized takes into consideration factors such as the guard member 22 not returning completely to its guarding position when making a 45° cut, the guard member returning past its guarding position as a result of loss of the rubber stop member 30, etc.

In summary, a new and improved releasable guard member latching device, such as the latching device 32, for a portable hand tool, such as the circular power saw 10, has been provided to help preclude serious injury to an operator during a cutting or sawing operation. When the circular power saw 10 is not operative, or is operative but is not being used in a sawing operation, the releasable latching device 32 positively locks the guard member 22 in its guarding position with respect to the rotary saw blade 20. When it is desired to utilize the circular power saw 10 for a sawing operation, the releasable latching device 32 can readily be moved to its unlatched position by the operator, as a result of the push rod 52 and the push button 62 thereon projecting from the motor housing 12 closely adjacent the top gripping handle 16. After the guard member 22 has begun to be rotated to its unguarding position during a sawing operation, the latching device 32 is retained in its unlatched position temporarily by the permanent magnet 64 on the latch member 34 cooperating with the ferromagnetic strip 66 in the non-magnetic hub 48 of the guard member. Subsequently, after the second retaining notch 46 and, when utilized, the notch 50 in the hub 48 of the guard member 22, have cleared the hook 44 on the latch member 34, the permanent magnet 64 and the ferromagnetic strip 66 become disengaged to permit the latch member to be returned toward its latching position by the push rod coil return spring 60. After the guard member 22 has returned to its guarding position upon completion of the sawing operation, the coil return spring 60 then automatically causes the hook 44 on the latch member to re-engage in the retaining slot 46, or the retaining slot 50, respectively, in the hub member 48 of the guard member, again positively locking the guard member in its guarding position.

What is claimed is:

1. A portable hand tool, which comprises:

means for supporting a movable cutting member for performing a cutting operation on an article;

a pivotable guard member movable between guarding and unguarding positions with respect to the tool cutting member;

a pivotable latch member pivotally mounted adjacent the guard member and movable between latched and unlatched positions with respect to the guard member, the latch member including a latching portion for engaging a retaining portion of the guard member to preclude movement of the guard member out of its guarding position;

means for moving the pivotable latch member into its latched position;

means for moving the pivotable latch member from its latched position into its unlatched position; and cooperative means on the pivotable latch member and the guard member for retaining the latch member in its unlatched position as the guard member is moved into its unguarding position during cutting of an article by the tool cutting member.

2. The portable hand tool as recited in claim 1, in which:

the tool is a circular power saw which includes a housing;

the guard member is pivotally mounted on one side of the housing and includes at least two spaced retaining portions for precluding movement of the guard member out of its guarding position;

the latch member is pivotally mounted adjacent the guard member on the one side of the housing;

a handle is mounted on an opposite side of the housing;

the means for moving the latch member into its unlatched position includes a push rod connected to the latch member and extending through the housing, with a portion of the push rod projecting from the opposite side of the housing adjacent the handle;

the means for moving the latch member into its latched position includes a resilient biasing means disposed between a portion of the push rod and the housing; and the means for retaining the latch member in its unlatched position includes cooperating permanent magnet means and ferromagnetic means mounted on respective ones of the latch member and the guard member.

3. A portable hand tool, which comprises:

means for supporting a movable cutting member for performing a cutting operation on an article;

a guard member movable between guarding and unguarding positions with respect to the tool cutting member;

a housing;

a latch member movable between latched and unlatched positions with respect to the guard member, the guard member and the latch member being mounted adjacent one another on one side of the housing and the latch member including a latching portion for engaging a retaining portion of the guard member to preclude movement of the guard member out of its guarding position;

means for moving the movable latch member into its latched position;

a handle mounted on an opposite side of the housing;

an elongated push rod for moving the movable latch member from its latched position into its unlatched position, the push rod being connected to the latch member and extending through the housing with a portion of the push rod extending from the opposite side of the housing adjacent the handle; and cooperative means on the latch member and the guard member for retaining the latch member in its unlatched position as the guard member is moved into its unguarding position during cutting of an article by the tool cutting member.

4. A portable hand tool, which comprises:

means for supporting a movable cutting member for performing a cutting operation on an article;

a guard member movable between guarding and unguarding positions with respect to the tool cutting member;

a latch member movable between latched and unlatched positions with respect to the guard member, the latch member including a latching portion for engaging a retaining portion of the guard member to preclude movement of the guard member out of its guarding position;

means for moving the movable latch member into its latched position;

means for moving the movable latch member from its latched position into its unlatched position; and cooperative ferromagnetic means mounted on respective ones of the latch member and the guard member for retaining the latch member in its unlatched position as the guard member is moved into its unguarding position during cutting of an article by the tool cutting member.

5. The portable hand tool as recited in claim 4, in which:

one of the ferromagnetic means is a permanent magnet.

6. A releasable separate member latching device for use in an application such as a portable hand tool, which comprises:

a pivotable latch member movable between latched and unlatched positions wih respect to a separate member, the latch member having a latching portion for engaging a retaining portion of the separate member to preclude movement of the separate member from an initial locked position into a second unlocked position with respect to the latch member;

means for moving the pivotable latch member into its latched position;

means for moving the pivotable latch member from its latched position into its unlatched position;

means for retaining the pivotable latch member in its unlatched position to permit movement of the separate member to its unlocked position with respect to the latch member; and means for releasing the means for retaining the pivotable latch member in its unlatched position, after the separate member has moved out of its initial locked position.

7. The releasable separate member latching device as recited in claim 6, in which:

the means for moving the latch member to its latched position is a resilient biasing means;

the means for retaining the latch member in its unlatched position is a ferromagnetic means; and the means for moving the latch member from its latched position into its unlatched position is an elongated push rod connected to an operating portion of the latch member for moving the latch member into its unlatched position against the action of the resilient biasing means, the push rod being of a length to extend from adjacent one side of an associated housing, through the housing to and beyond an opposite side of the housing, and the means for releasing the latch member from its retained unlatched position, after the separate member has moved out of its initial locked position, is a non-magnetic means.

8. The releasable separate member latching device as recited in claim 7, in which:

the latching portion of the pivotable latch member includes a hook;

the ferromagnetic means is on the pivotable latch member and is a permanent magnet; and the latching portion hook, operating portion and permanent magnet on the pivotable latch member are provided on respective parts of the latch member.

9. A releasable separate member latching device for use in an application such as a portable hand tool, which comprises:

a latch member movable between latched and unlatched positions with respect to a separate member, the latch member having a latching portion for engaging a retaining portion of the separate member to preclude movement of the separate member from an initial locked position into a second unlocked position with respect to the latch member;

means for moving the movable latch member into its latched position;

means for moving the movable latch member from its latched position into its unlatched position;

ferromagnetic means for retaining the latch member in its unlatched position to permit movement of the separate member to its unlocked position with respect to the latch member; and means for releasing the ferromagnetic means for retaining the latch member in its unlatched position, after the separate member has moved out of its initial locked position.

10. The releasable separate member latching device as recited in claim 9, in which:

the ferromagnetic means is a permanent magnet on the latch member.

11. A releasable guard member latching device for use in a portable hand tool having a cutting member for performing a cutting operation on an article, which comprises:

a latch member movable between latched and unlatched positions with respect to a guard member for the tool cutting member, the latch member having a latching portion for engaging a portion of the guard member when the latch member is in the latched position, to preclude movement of the guard member from a guarding position into an unguarding position with respect to the tool cutting member;

means for moving the movable latch member into its latched position;

means for moving the movable latch member from its latched position into its unlatched position to release the guard member for movement from the guarding position to the unguarding position, the moving means including an elongated push rod connected to an operating portion of the latch member and of a length to extend from adjacent one side of a housing of the portable hand tool, through the housing to and beyond an opposite side of the housing;

means for retaining the latch member in its unlatched position to permit movement of the guard member to an unguarding position with respect to the tool cutting member for an article cutting operation; and means for releasing the latch member from its retained unlatched position after the guard member has moved out of its guarding position with respect to the tool cutting member for an article cutting operation.

12. The releasable guard member latching device as recited in claim 11, in which:

the latch member retaining means includes means mounted on the latch member which is cooperable with means on the guard member to retain the latch member in its unlatched position.

13. A releasable guard member latching device for use in a portable hand tool having a cutting member for performing a cutting portion on an article, which comprises:

a pivotable latch member movable between latched and unlatched positions with respect to a guard member for the tool cutting member, the latch member having a latching portion for engaging a portion of the guard member to preclude movement of the guard member from a guarding position into an unguarding position with respect to the tool cutting member;

means for moving the pivotable latch member into its latched position;

means for moving the pivotable latch member from its latched position into its unlatched position, the moving means including an elongated push rod connected to an operating portion of the pivotable latch member and of a length to extend from adjacent one side of a housing of the portable hand tool, through the housing to and beyond an opposite side of the housing;

means for retaining the pivotable latch member in its unlatched position to permit movement of the guard member to an unguarding position with respect to the tool cutting member for an article cutting operation; and means for releasing the pivotable latch member from its retained unlatched position after the guard member has moved out of its guarding position with respect to the tool cutting member for an article cutting operation.

14. A releasable guard member latching device for use in a portable hand tool having a cutting member for performing a cutting portion on an article, which comprises:

a latch member movable between latched and unlatched positions with respect to a guard member for the tool cutting member, the latch member having a latching portion for engaging a portion of the guard member to preclude movement of the guard member from a guarding position into an unguarding position with respect to the tool cutting member;

means for moving the movable latch member into its latched position;

means for moving the movable latch member from its latched position into its unlatched position, the moving means including an elongated push rod connected to an operating portion of the latch member and of a length to extend from adjacent one side of a housing of the portable hand tool, through the housing to and beyond an opposite side of the housing;

ferromagnetic means on the latch member cooperable with ferromagnetic means on the guard member for retaining the latch member in its unlatched position to permit movement of the guard member to an unguarding position with respect to the tool cutting member for an article cutting operation; and means for releasing the latch member from its retained unlatched position after the guard member has moved out of its guarding position with respect to the tool cutting member for an article cutting operation.

15. The releasable guard member latching device as recited in claim 14, in which:

one of the ferromagnetic means is a permanent magnet.

16. The releasable guard member latching device as recited in claim 15, in which:

the latch member is a pivotable member;

the latching portion on the pivotable latch member includes a hook;

the means for moving the latch member into its latched position is a resilient biasing means, and the latching portion hook, operating portion and permanent magnet on the pivotable latch member are provided on respective parts of the latch member.

17. A releasable separate member latching device for use in an application such as a portable hand tool, which comprises:

a latch member movable between latched and unlatched positions with respect to a separate member, the latch member having a latching portion for engaging a retaining portion of the separate member when the latch member is in its latched position, to preclude movement of the separate member from an initial locked position into a second unlocked position with respect to the latch member;

means for moving the movable latch member into its latched position;

means for moving the movable latch member from its latched position into its unlatched position to release the separate member for movement from its initial locked position to its second unlocked position with respect to the latch member, the latch member moving means including an elongated push rod connected to the latch member and of a length to extend from adjacent one side of an associated housing, through the housing and beyond an opposite side of the housing;

means for retaining the latch member in its unlatched position to permit movement of the separate member to its unlocked position with respect to the latch member; and means for releasing the means for retaining the latch member in its unlatched position, after the separate member has moved out of its initial locked position.

18. A portable hand tool, which comprises:

a housing;

means for supporting a movable cutting member on the housing, for performing a cutting operation on an article;

a guard member mounted on one side of the housing and movable between guarding and unguarding positions with respect to the tool cutting member;

a latch member mounted on the one side of the housing adjacent the guard member and movable between latched and unlatched positions with respect to the guard member, the latch member including a latching portion for engaging a retaining portion of the guard member when the latch member is in its latched position, to preclude movement of the guard member out of its guarding position;

means for moving the movable latch member into its latched position;

means for moving the movable latch member from its latched position into its unlatched position to release the guard member for movement from the guarding position to the unguarding position, and including an elongated push rod connected to the latch member and extending through the housing with a portion of the push rod extending from an opposite side of the housing; and means for retaining the latch member in its unlatched position as the guard member is moved into its unguarding position during cutting of an article by the tool cutting member.

* * * * *